(12) United States Patent
Shome (10) Patent No.: US 9,908,634 B2
(45) Date of Patent: Mar. 6, 2018

(54) PRESSURIZED COMPOSITE FLUID LINES AND METHOD

(71) Applicant: The Boeing Company, Chicago, IL (US)

(72) Inventor: Moushumi Shome, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/138,377

(22) Filed: Apr. 26, 2016

(65) Prior Publication Data

US 2017/0305569 A1    Oct. 26, 2017

(51) Int. Cl.
| | | |
|---|---|---|
| *F16L 11/12* | (2006.01) | |
| *B64D 37/00* | (2006.01) | |
| *B64F 5/00* | (2017.01) | |
| *F16L 9/12* | (2006.01) | |
| *F16L 9/14* | (2006.01) | |

(52) U.S. Cl.
CPC .......... *B64D 37/005* (2013.01); *B64F 5/0009* (2013.01); *F16L 9/12* (2013.01); *F16L 9/14* (2013.01)

(58) Field of Classification Search
CPC ............. F16L 11/04; F16L 11/10; F16L 11/12
USPC .......................... 138/123–126, 129, 140, 137
See application file for complete search history.

(56) References Cited

U.S. PATENT DOCUMENTS

| | | | | |
|---|---|---|---|---|
| 3,830,261 A | * | 8/1974 | Hochberg | .......... F16L 55/1616 138/127 |
| 3,992,505 A | * | 11/1976 | Tally | ...................... B29C 33/485 138/125 |
| 4,380,252 A | * | 4/1983 | Gray | ...................... B29C 44/324 138/125 |
| 4,961,977 A | * | 10/1990 | Archer | ................. B29C 61/0658 138/123 |
| 5,507,320 A | | 4/1996 | Plumley | |
| 5,573,039 A | | 11/1996 | Mang | |
| 5,997,970 A | * | 12/1999 | You | ......................... A01K 87/00 138/123 |
| 6,016,845 A | * | 1/2000 | Quigley | ................... D04C 1/06 138/125 |
| 6,165,163 A | * | 12/2000 | Chien | ................ A61M 25/0053 604/523 |
| 7,566,486 B2 | * | 7/2009 | Bourgois | .................. D04C 1/02 138/123 |
| 7,934,676 B2 | | 5/2011 | Dufresne et al. | |

(Continued)

FOREIGN PATENT DOCUMENTS

| | | |
|---|---|---|
| CN | 201672177 U | 12/2010 |
| GB | 2526986 A | 12/2015 |
| JP | H02178028 A | 7/1990 |

OTHER PUBLICATIONS

Great Britain Intellectual Property Office Search report, dated Sep. 21, 2017, regarding Application No. GB1704686.3, 11 pages.

*Primary Examiner* — Patrick F Brinson
(74) *Attorney, Agent, or Firm* — Yee & Associates, P.C.

(57) ABSTRACT

A fluid line adapted to contain a pressurized fluid imposing loads on the line that vary along its length comprises a tube formed of a fiber reinforced plastic, wherein the fibers are locally tailored along the length of the tube to meet local load requirements. The tube is consolidated within a volumetric chamber having separate, individually controlled chamber compartments for respectively consolidating different segments of the tube.

13 Claims, 11 Drawing Sheets

(56) References Cited

U.S. PATENT DOCUMENTS

| | | | |
|---|---|---|---|
| 8,518,052 B2* | 8/2013 | Burgermeister | A61B 17/22 600/141 |
| 2015/0283658 A1 | 10/2015 | Ellsworth et al. | |
| 2015/0289412 A1* | 10/2015 | Ellsworth, Jr. | F16L 11/085 361/699 |
| 2016/0075425 A1 | 3/2016 | Fong et al. | |

* cited by examiner

PRESSURIZED COMPOSITE FLUID LINES AND METHOD

BACKGROUND INFORMATION

1. Field

The present disclosure generally relates to lines for carrying pressurized fluids, and deals more particularly with composite tubes and a method of making the tubes.

2. Background

Lines for carrying pressurized fluids are used in a wide variety of applications. Pressurized fluid lines are often made of metal, in part because of their ease of fabrication. Metal fluid lines, however have certain disadvantages in some applications, such as fuel systems for aircraft where tubes, couplers, clamps, brackets and bulkhead fittings are often fabricated from aluminum or titanium. These metal fuel system components add undesirable weight to aircraft and may have less than desired weld strength. Additionally, these metal components must be specially treated to protect against electromagnetic effects (EME) resulting from lightning strikes. The processes used to treat the components against EME are time consuming and add to aircraft production costs. Further, the volumetric chamber used to manufacture these fluid lines is not sufficiently robust to achieve fluid line bend designs with the desired precision.

SUMMARY

The disclosure relates in general to pressurized fluid lines, and more specifically to fuel line assemblies for vehicles such as aerospace vehicles.

According to one aspect, a fuel line adapted to contain a pressurized fluid comprises a tube formed of plastic reinforced with fibers that are locally tailored along the length of the tube.

According to another aspect, a fuel line comprises at least a first tube adapted to contain a pressurized fluid. The tube includes a plurality of laminated layers of a braided composite.

According to a further aspect, apparatus is provided for consolidating a composite laminate tube having sections along its length respectively tailored to meet local load requirements. The apparatus includes a volumetric chamber into which the composite laminate tube may be placed for consolidation. The volumetric chamber includes a plurality of internal volumetric chamber compartments within which sections of the composite laminate tube may be respectively contained. The volumetric chamber compartments are individually controlled based on the geometry of the tube section that is contained in each compartment. Substantially vacuum tight seals separate the internal compartments from each other. A plurality of valves respectively in communication with the internal compartments are adapted be coupled with a source of pressure for applying different levels of compaction pressure respectively to the sections of the composite laminate tube. The pressure of the volumetric chamber can be controlled on a tube segment-by-segment basis.

According to still another aspect, a method is provided for fabricating a fuel line that is adapted to be pressurized with fuel. The method includes forming a tube by braiding sleeves of fiber reinforced plastic on a mandrel, including tailoring the fibers to meet local load requirements that vary along the length of the fuel line. The method also includes consolidating the sleeves by subjecting the tube to heat and pressure, and removing the mandrel from the tube after the sleeves have been consolidated.

One of the advantages of the pressurized fluid line is that it is lightweight and relatively easy to manufacture. Another advantage is that the fluid line is designed to satisfy local load requirements. Still another advantage of the fluid line is that is not subject to the effects of EME.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
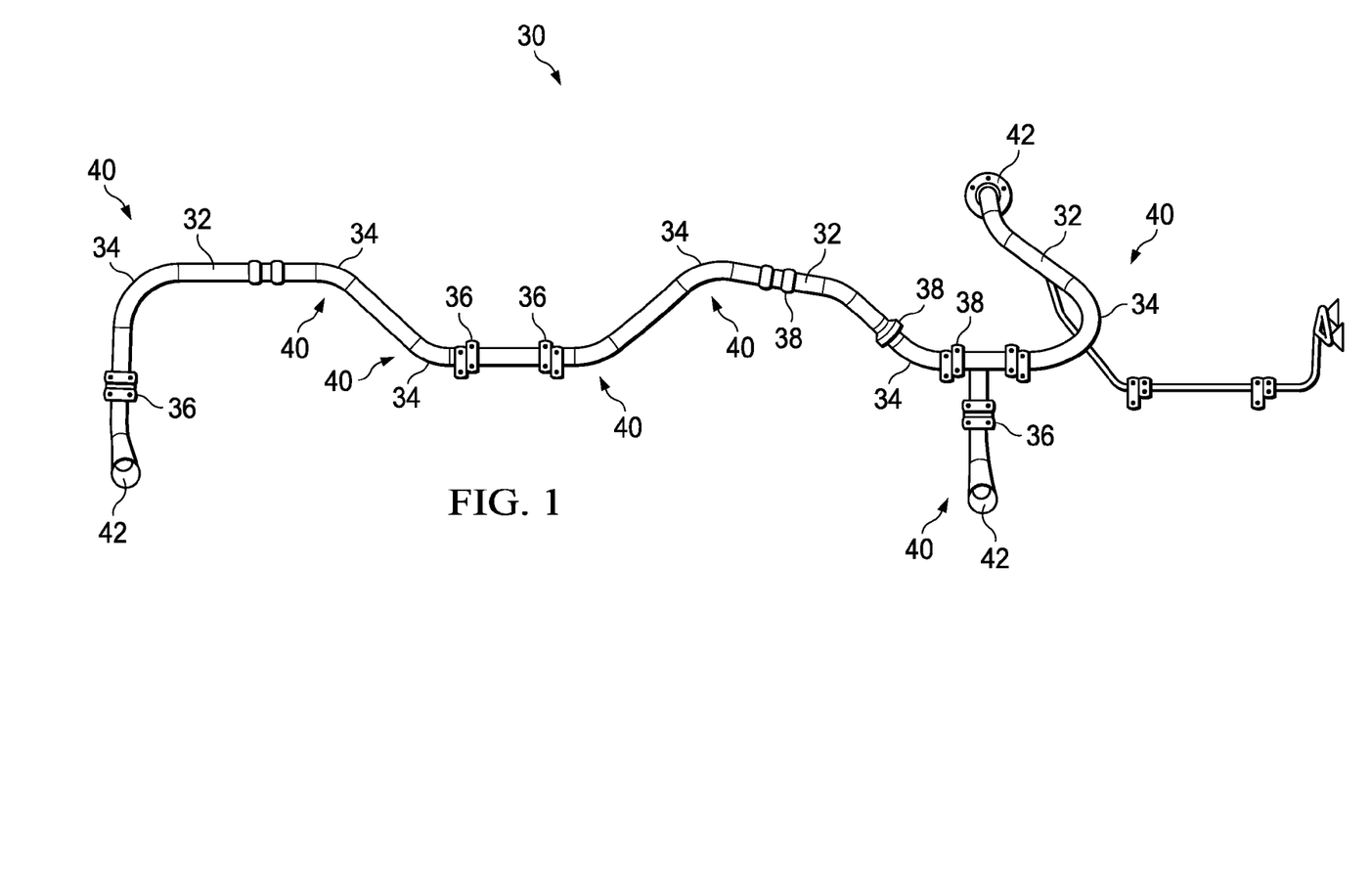
FIG. 1 is an illustration of an isometric view of a fuel line assembly.
Figure 2:
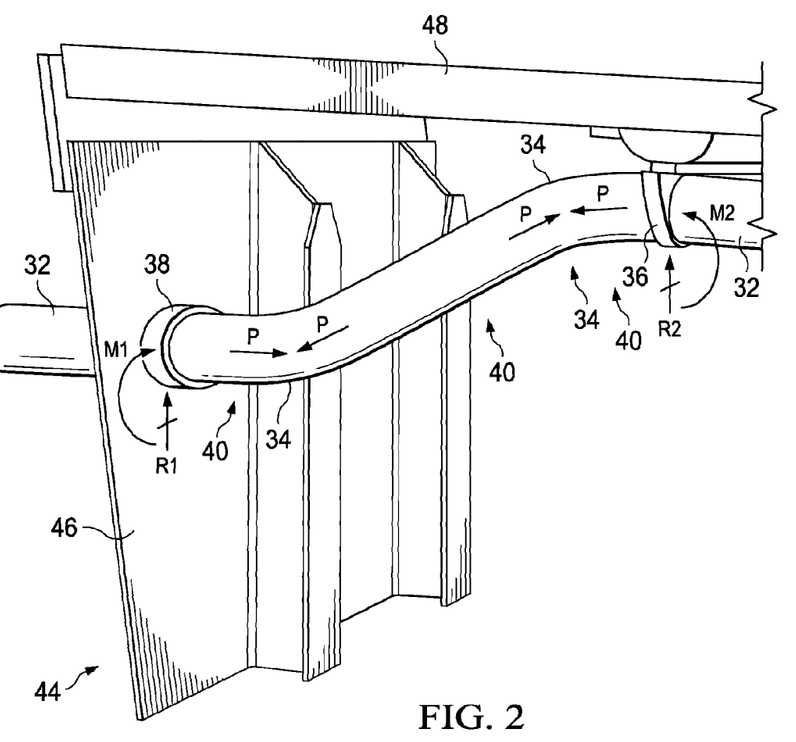
FIG. 2 is an illustration of a perspective view of a composite tube adapted to carry a pressurized fuel line, shown attached to an aircraft structure.

Referring first to FIGS. 1 and 2, a fluid line assembly 30 is adapted to contain a pressurized fluid such as, without limitation, fuel or a hydraulic fluid. The pressurized fluid imposes varying loads on the fluid line assembly 30 along its length. The fluid line assembly 30 includes a plurality of composite tubes 32 (FIG. 1) joined together by couplings 38. As will be discussed below in more detail, the composite tubes 32 are reinforced with fibers that are locally tailored along the length of the tubes 32 to satisfy varying load conditions imposed by the pressurized fluid. As a result of this tailoring, an optimized distribution of shear, axial and plug load is achieved. In the illustrated example, the fluid line assembly 30 comprises a fuel line on an aircraft, having one or more inlets or outlets 42 that are adapted be coupled with a source of pressurized fuel such as a fuel pump (not shown). However as noted above, the fluid line assembly 30 may comprise a hydraulic line on the aircraft that is adapted to be coupled with one or more hydraulic pumps used to operate various hydraulically driven mechanisms on the aircraft.

The fluid line assembly 30 also include brackets 36 suitable for mounting the composite tube 32 on a supporting structure 44 (FIG. 2) such as the bulkhead 46 or a beam 48 on the aircraft. In some embodiments, however, the fluid line assembly 30 may comprise a single, continuous tube 32 that does not include brackets 36 and/or couplings 38. As will be discussed below in more detail, the composite tube 32, as well as the brackets 36 and couplings 38 are formed of a composite material such as a fiber reinforced plastic, resulting in an all-composite fuel line assembly 30 that is lightweight, economical to manufacture, efficient in distributing loads, not subject to EME resulting from lightning strikes or other causes. The composite tubes 32 used in the fluid line assembly 30 resist higher temperatures and are capable of carrying higher axial and shear loads, compared to metal tubes. Further, the disclosed composite tubes 32 are capable of resisting tube bend stress and stress concentration near the ends of bends in the tubes 32. By employing composite tubes 32, the need for coating fuel lines to protect them against lightning strikes is eliminated. The geometric configuration of the fluid line assembly 30 will vary with the application, but at least some of the tubes 32 include one or more sections 40 having nonlinear features or areas, such as bends or curves 34.

Referring now particularly to FIG. 2, internal fluid pressure within the composite tube 32 generates an axial plug load P that results in shear and bending stresses that vary along the length of the composite tube 32, depending upon its geometry. For example, the bends 34 or similar non-linear tube features, cause the plug load P to produce a twisting force, causing moments M1, M2 to be applied to the tube at the bends 34 that result in shear stress being applied at these locations on the composite tube 32. The composite tube 32 is required to produce corresponding reaction forces R1, R2 that react the applied moments M1, M2, thereby resisting the applied twisting force. Depending upon the geometry of the composite tube 32, it may be appreciated that the loads and stresses that must be reacted by the composite tube 32 may vary along its length. As will be discussed below in more detail, the composite tube 32 is locally tailored in construction to optimally distribute these loads and resist the resulting stresses.

Figure 3:
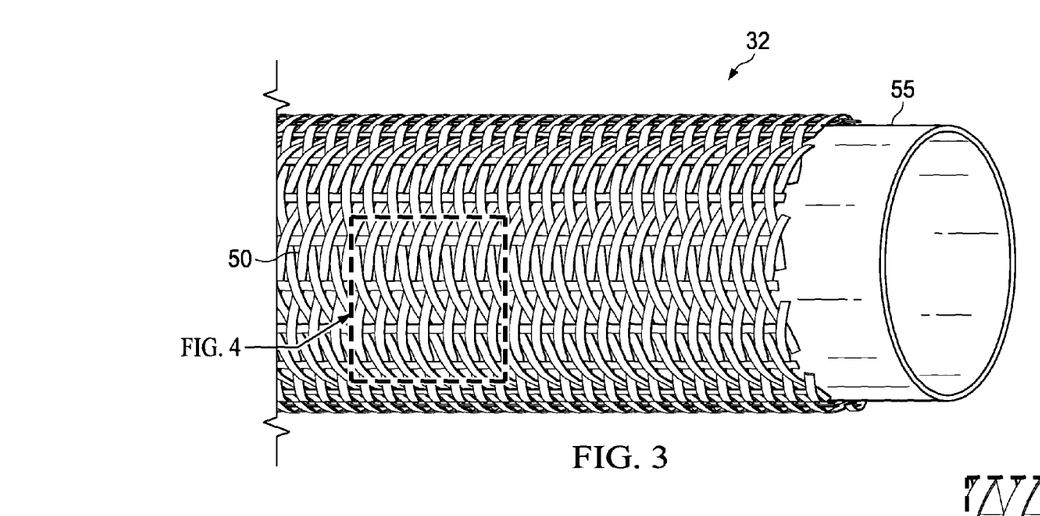
FIG. 3 is an illustration of a perspective view of a portion of the composite tube shown in FIG. 2.
Figure 4:
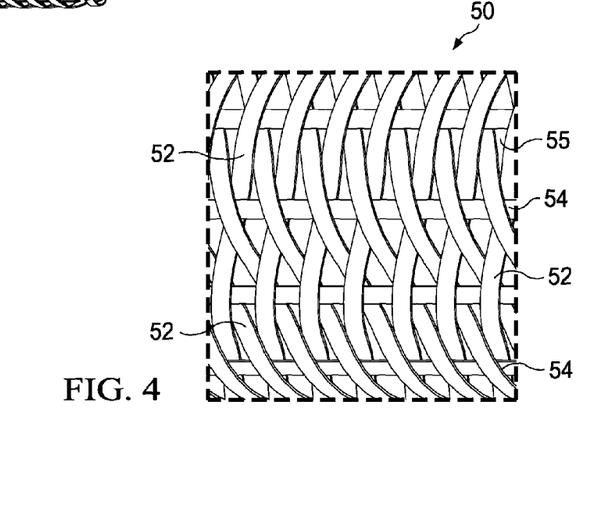
FIG. 4 is an illustration of the area designated as "FIG. 4" in FIG. 3.
Figure 5:
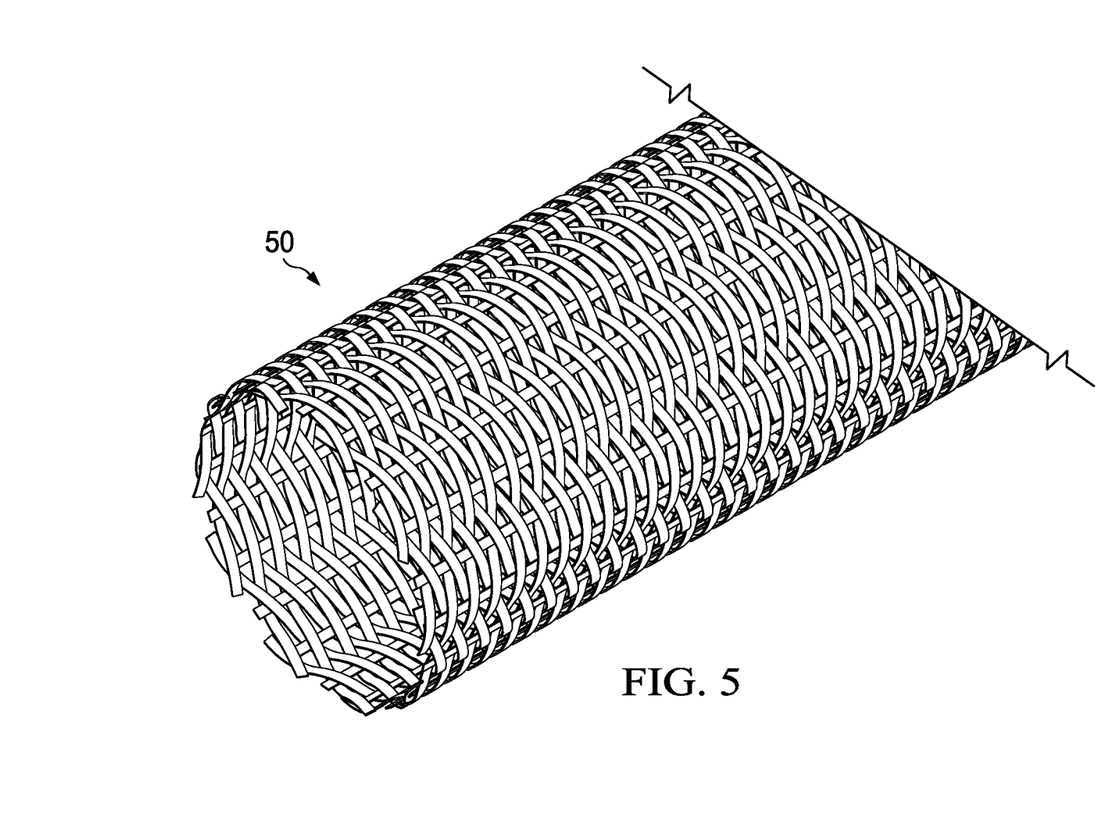
FIG. 5 is an illustration of a perspective view of a braided composite sleeve forming part of the composite tube shown in FIGS. 2 and 3.
Figure 7:
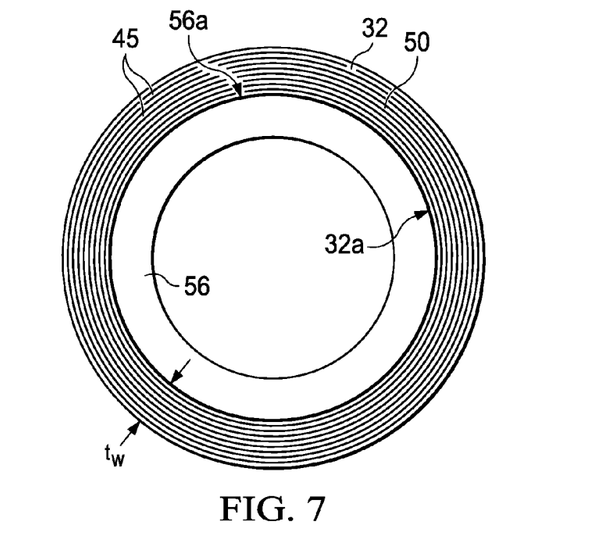
FIG. 7 is an illustration of a sectional view taken along the line 7-7 in FIG. 6.

Attention is now directed to FIGS. 3, 4 and 5 which illustrate the construction of the composite tube 32 in more detail. The composite tube 32 comprises fiber reinforced plastic, formed by a plurality of concentric, braided composite sleeves 50. The composite sleeves of braided reinforcing fibers form laminated composite plies (see FIG. 7). Each of the braided composite sleeves comprises bi-axial and/or tri-axial braided reinforcing fibers 52, 54 held in a plastic matrix 55 suitable for the application. For example, and without limitation, the plastic matrix may comprise a thermoset material such as epoxy, or a thermoplastic material such as PEI (polyetherimide) PPS (polyphenylene sulphide), PES (polyethersulfone), PEEK (polyetheretherketone), PEKK (polyetheretherketone), and PEKK-FC (polyetherketoneketone-fc grade), to name only a few. In a fuel line application for an aircraft, the plastic matrix 55 comprises a thermoplastic. The reinforcing fibers 52, 54 may be any of a variety of high strength fibers, such as, without limitation, carbon, metal, ceramic and/or glass fibers that are suitable for the application. In a fuel line application for an aircraft, the reinforcing fibers are non-conductive fibers such as glass fibers.

The reinforcing fibers comprise angularly oriented, braid fibers 52, and axial fibers 54 having a 0° degree fiber orientation, circularly braided in mechanically interlocking relationship. In the illustrated example, the reinforcing fibers 52, 54 are pre-impregnated (pre-preg) with the plastic matrix material 55. For example, the reinforcing fibers 52, 54 may be pre-preg tows. In other examples in which the composite tube 32 is produced by a resin transfer process, the reinforcing fibers 52, 54 may be dry fibers or partially impregnated fibers. As will be discussed below, the size, weight, angular orientation and density of the fibers 52, 54 are locally tailored along the length of the composite to 32 in order optimally distribute applied loads and resist local stresses resulting from, for example, bends or curves 34 in in the tube 32.

Figure 6:
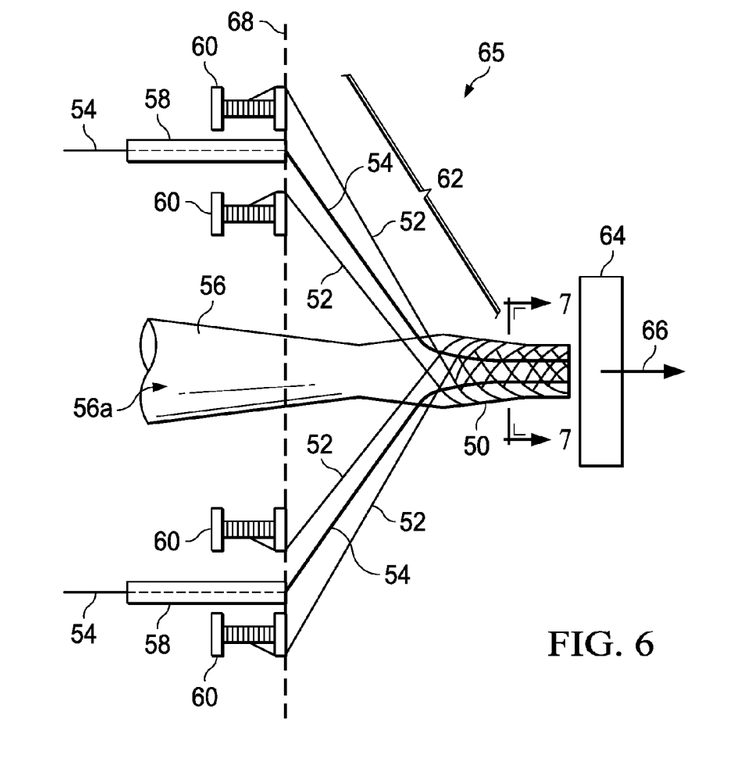
FIG. 6 is an illustration of a side elevational view of a circular braider for braiding composite sleeves on a mandrel.

In the illustrated example, the composite tube is fabricated using a braiding machine, such as the circular braider 65 shown in FIG. 6. Carriers 60 containing the braid fibers 52, 54 are moved circularly in opposite directions, along a braiding plane 68, around a mandrel 56. In one example, the mandrel 56 is formed of a shape memory metal alloy that returns to a shape after a tube 32 has been consolidated, allowing it to be removed from the composite tube 32. In other examples, the mandrel 56 may be formed of a dissolvable material such as a water soluble material that is washed out of the cured composite tube 32 after it has been consolidation. In still other examples, the mandrel 56 may comprise multiple parts that are mechanically disassembled after the composite tube 32 is cured to allow the mandrel to be removed from the composite tube 32.

Axial composite fibers 54 are fed through guides 58, and drawn into a convergence zone 62 along with the braid fibers 52, 54 that are pulled from the carriers 60. As the fibers 52, 54 pass through the convergence zone 62, they are interlaced into a braided sleeve 50 that is drawn down onto the surface 56a of mandrel 56. The mandrel surface 56a has a size and shape respectively corresponding to the size and shape of the inside wall 32a of the tube 32. A transport mechanism 64 moves the mandrel 56 in a direction of travel 66 as the braiding process continues. The angular orientations of the braid fibers 52 depend at least in part on the speed at which the mandrel 56 moves through the circular braider 65. The braid angle θ (FIG. 9), the size of the fibers 52, 54 and the number of axial fibers 54 are varied during the braiding process in order to locally tailor the braided sleeve 50 to satisfy local load conditions on the composite tube 32. By locally varying these parameters, a desired set of fiber orientations as well as a desired areal fiber density is achieved which optimize loading of the composite tube 32.

Figure 8:
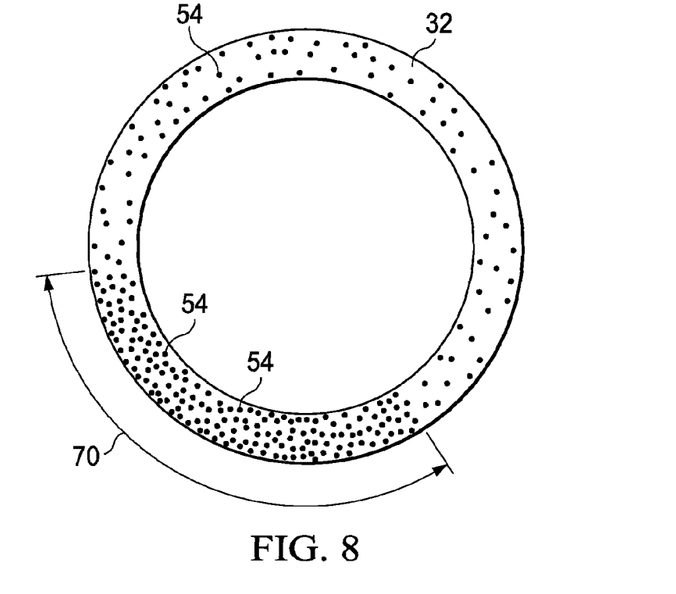
FIG. 8 is an illustration of a cross sectional view of a composite tube having an area of increased axial fiber density.
Figure 9:
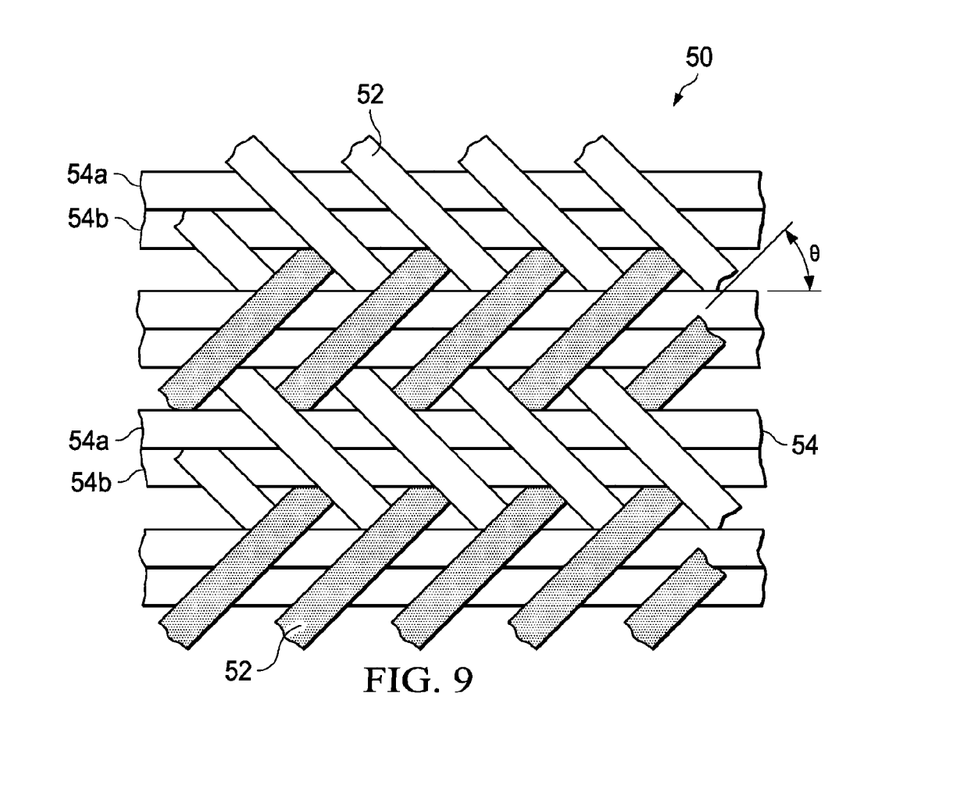
FIG. 9 is an illustration of a plan view of a portion of one of the braided composite sleeves forming part of the composite tube shown in FIG. 8.
Figure 10:
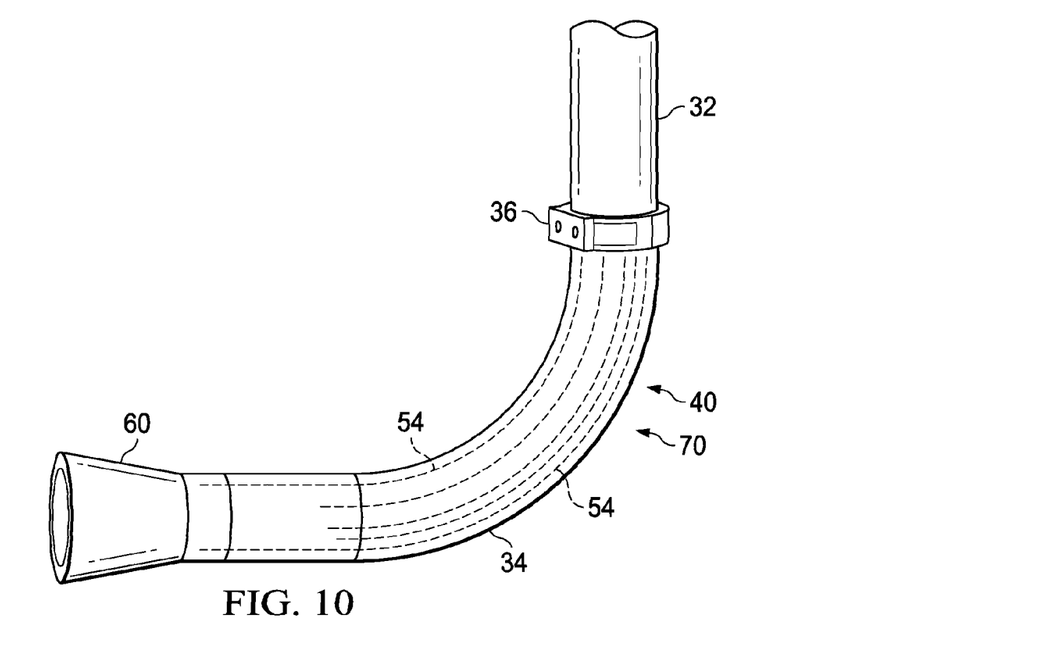
FIG. 10 is an illustration of a perspective view of a section of the composite tube forming part of the fluid line assembly shown in FIG. 1, diagrammatically showing an area having an increased density of axial fibers.

Attention is now directed to FIGS. 8, 9 and 10 which illustrate one example of how the composite tube is locally tailored to optimize tube loading and resist local stresses, including shear stresses, axial stresses and bending stresses produced by pressure plug loads. A section 40 (also shown in FIG. 1) of one of the composite tubes 32 includes a substantially 90° bend (FIG. 10). The pressurized fluid within the composite tube 32 produces a plug load P that causes bending stresses to be applied to an outside radius section 70 of the bend 34. In order to react to these bending stresses and optimally distribute the applied loads, the density of axial fibers 54 is increased (see FIG. 8) within the outside radius section 70. The axial fiber density is increased by selectively adding additional axial fibers 54, 54b to the outside radius section 70 of one or more of the braided sleeves 50 during the braiding process. Thus, from the foregoing, it can be appreciated that, in one example, local tailoring of the composite tube 32 by constructing it such that, in certain areas along its length, it has a cross sectional area having a non-uniform fiber density. In other words, certain areas of the tube 32 have differently tailored fibers.

Figure 11:
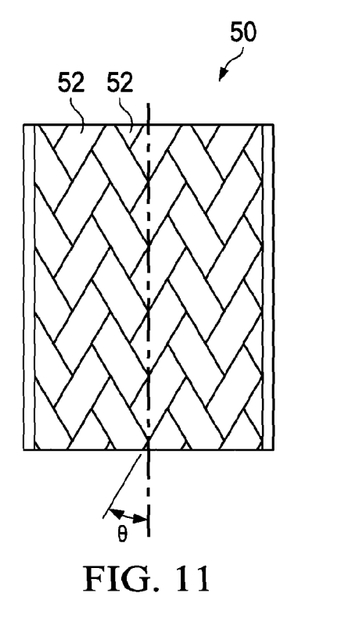
FIGS. 11 and 12 are illustrations of plan views of a portion of a braided composite sleeve, useful in explaining variation of the braid angle.
Figure 12:
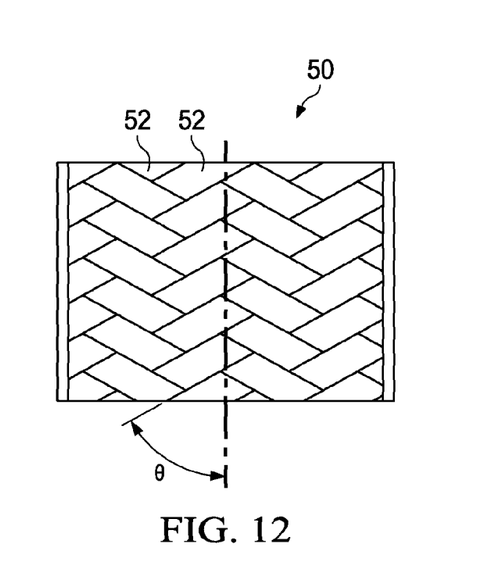
Figure 13:
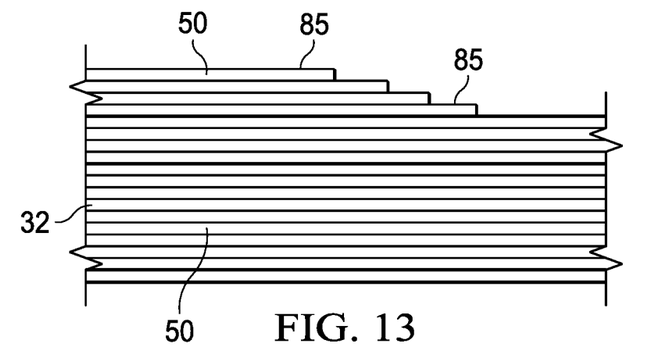
FIG. 13 is an illustration of a fragmentary, longitudinal sectional view of a portion of the composite tube, showing local tailoring achieved through ply drop-offs.
Figure 14:
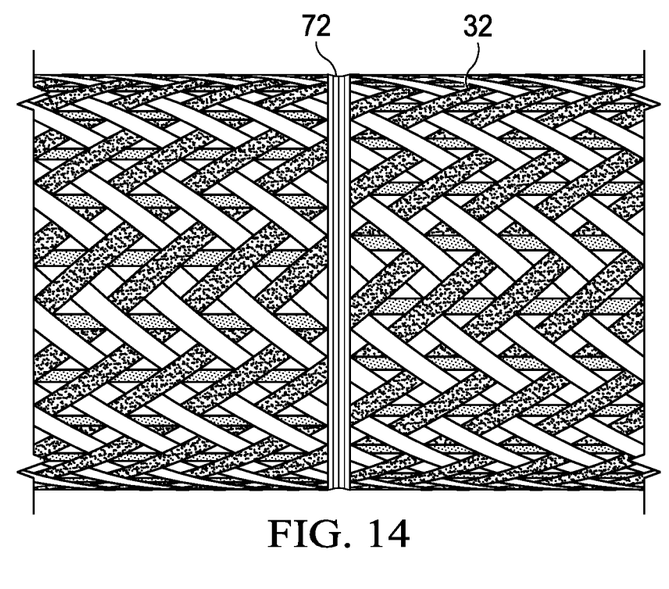
FIG. 14 is an illustration of a portion of a composite tube in which circumferential reinforcing fibers are overwrapped around a composite tube.

Referring to FIGS. 9, 11 and 12, in addition to varying the local axial fiber density, the braid angle θ, i.e. the angle formed between the braid fibers 52 in one or more of the braided sleeves 50, is varied to optimize the loading conditions in the area of the bend 34. Alternate techniques can be employed in other examples to locally tailor the composite tube 32 to localized load requirements. For example, as shown in FIG. 13, one or more of the braided sleeves 50 can be braided as ply drop-offs during layup of the braided sleeves 50 on the mandrel 56. In other examples, as shown in FIG. 14, fiber pre-preg may be circumferentially overwrapped on one or more of the braided sleeves 50 at local areas of the composite tube 32, thereby providing the composite tube 32 with an overwrapping of fibers having a 90° fiber orientation.

Figure 15:
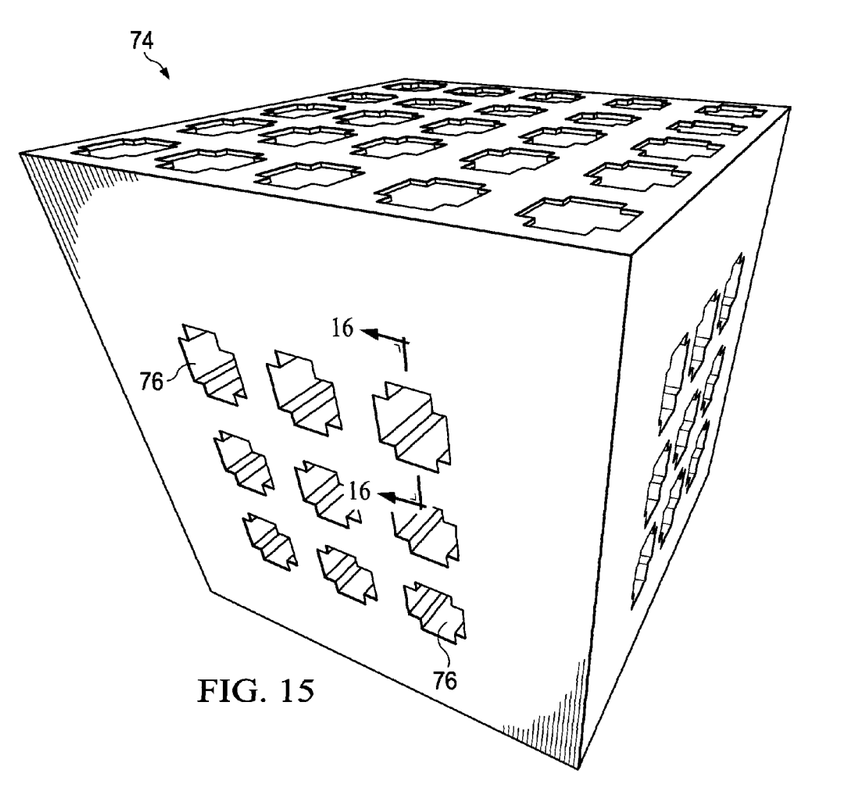
FIG. 15 is an illustration of a perspective view of a volumetric chamber used to consolidate one or more of the composite tubes.
Figure 16:
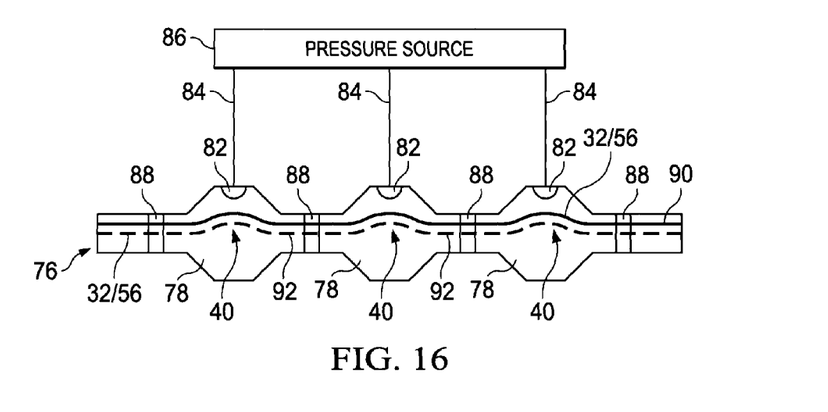
FIG. 16 is an illustration of a sectional view taken along the line 16-16 in FIG. 15, showing individual sealed compartments within the volumetric chamber.

Attention is now directed to FIGS. 15 and 16 which illustrate a volumetric chamber 74 in which the layup of multi-ply braided sleeves 50 on the mandrel 56 may be compacted, consolidated and cured. The volumetric chamber 74 includes one or more chambers 76 into which a composite tube layup on the mandrel 56 is placed for consolidation and curing. As shown in FIG. 16, each of the chambers 76 includes a plurality of individual volumetric chamber compartments 78 which are separated from each other by substantially vacuum tight seals 88 formed of any suitable materials, such as, without limitation, RTV silicone.

Each of the volumetric chamber compartments 78 encloses a corresponding section 40 of the composite tube 32, and is coupled by an individual pneumatic line 84 to a pressure source 86 through corresponding pressure valve 82. The separate pressure lines 84 and pressure valves 82 allow the associated compartment 78 to be pressurized to a predetermined level that is required to consolidate a particularly tailored section 40 of the tube 32. The combination of the composite tube 32 and mandrel 56 is surrounded and enclosed by the sealed vacuum bag 92. In one example, the vacuum bagged tube 32 is surrounded by a heating blanket 90 or similar heating device for heating the composite tube 32 to cure temperature, while in other examples, the volumetric chamber 74 is provided with integral healing elements (not shown). In still other examples, heating of the composite tube 32 may be achieved by placing the volumetric chamber 74 in an oven (not shown).

In use, following layup of the composite tube 32 on the mandrel 56 using the circular braider 65, the composite tube 32 and the mandrel 56 are placed in one of the individual volumetric chambers 76, and the seals 88 are installed to seal and isolate the volumetric chamber compartments 78 from each other. Each of the compartments is the pressurized at a predetermined level of pressure by the pressure source 86 in order to apply consolidation pressures that are individually suited to the tube sections 40, in accordance with the local fiber tailoring of those sections. Following consolidation and curing of the composite tube 32, the composite tube 32 and mandrel 56 are removed from the volumetric chamber 74, and the mandrel 56 is removed from the fully consolidated and cured composite tube 32. Depending upon its construction, the mandrel 56 is removed either by disassembling, dissolving or returning it to a temperature that causes it to contract and release from the cured composite tube 32.

Figure 17:
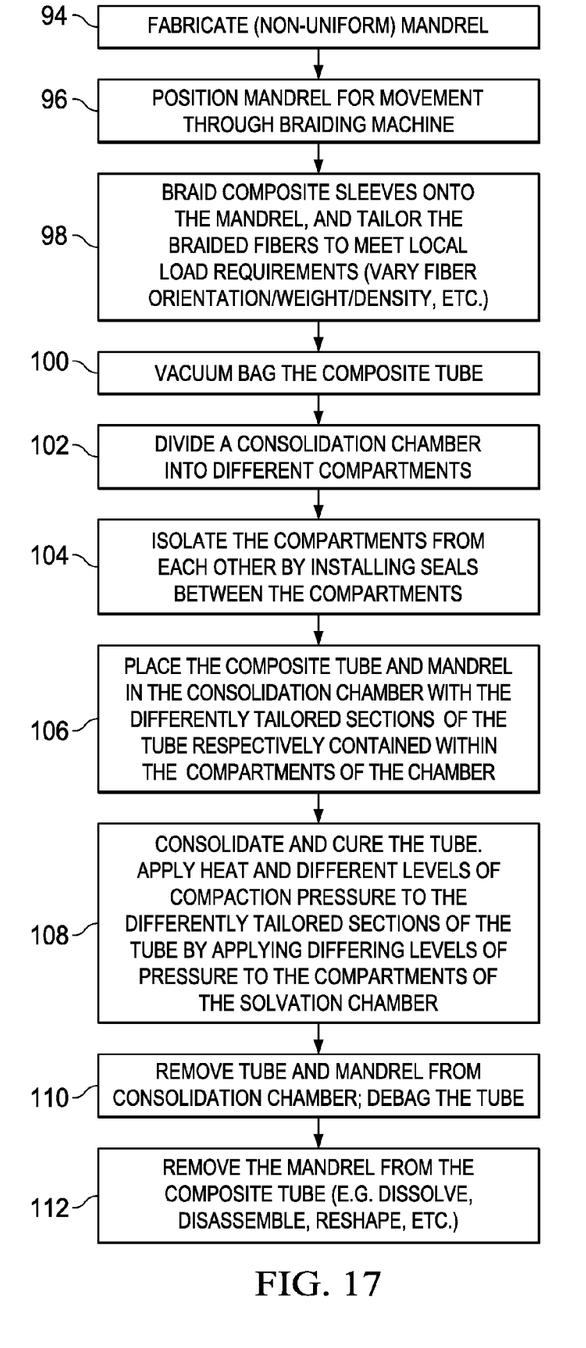
FIG. 17 is an illustration of a flow diagram of a method of fabricating a composite fuel line.

Attention is now directed to FIG. 17 which broadly illustrates the overall steps of a method of fabricating a composite tube 32 suitable to be pressurized with a fluid. At 94, a mandrel 56 is fabricated which has a non-uniform cross-sectional shape along its length. At 96, the mandrel 56 is mounted in position before it is moved through a circular braider 65. At 98, composite sleeves 50 are braided onto the mandrel 56. The fibers 52, 54 used to braid the sleeves are tailored to meet local load requirements by varying either, or any, of fiber orientations, weights, numbers, density or other parameters related to the fibers 52, 54. At 100, the composite tube 32 and the mandrel 56 are vacuum bagged. At 102, the volumetric chamber 74 is divided into a number of different volumetric chamber compartments 78. At 104, the volumetric chamber compartments 78 are isolated from each other by installing seals 88 between the compartments 78. At 106, the vacuum bagged composite tube 32 and mandrel are placed in the volumetric chamber 74, with the differently tailored sections 40 of the tube 32 respectively contained within the compartments 78 of the volumetric chamber 74. At 108, the composite tube 32 is consolidated and cured by applying heat and different levels of compaction pressure to the differently tailored sections 40 of the tube 32. The compaction pressures are applied by applying different levels of pressure in the compartments 78 of the volumetric chamber 74. At 110, the composite tube 32 and mandrel 56 are removed from the volumetric chamber 74 and de-bagged, following which, the mandrel 56 is removed from the cured composite tube 32 using suitable techniques, as previously described.

Figure 18:
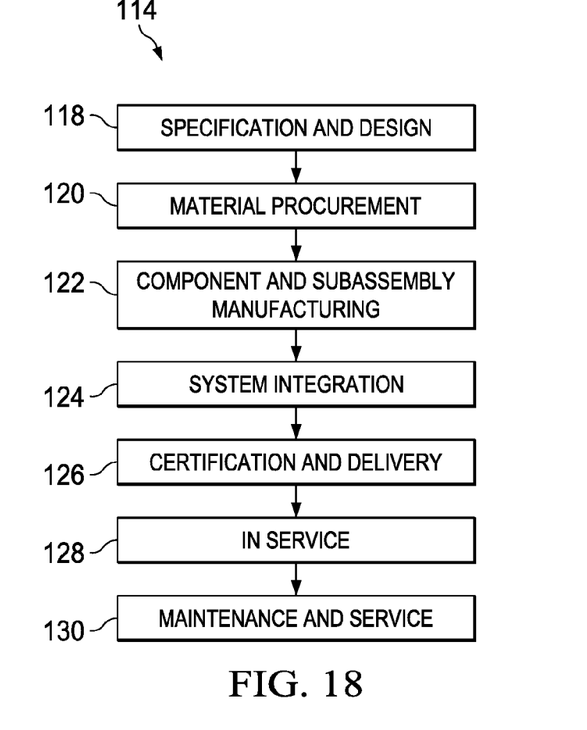
FIG. 18 is an illustration of a flow diagram of aircraft production and service methodology.
Figure 19:
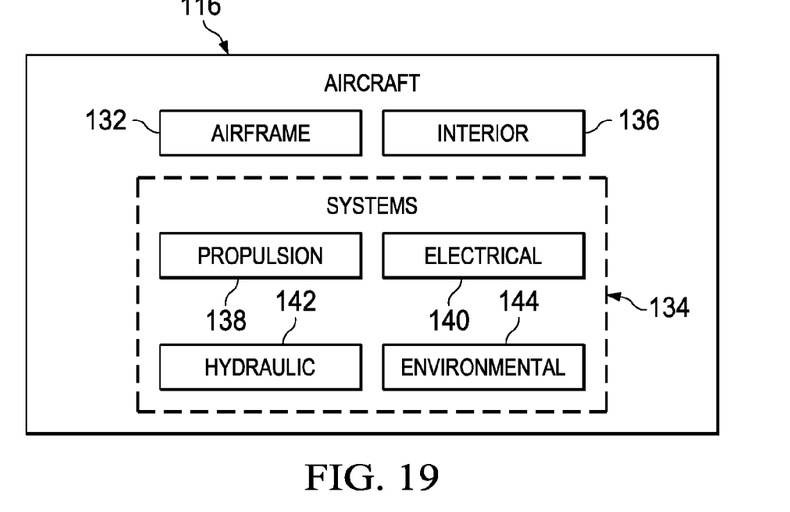
FIG. 19 is an illustration of a block diagram of an aircraft.

Embodiments of the disclosure may find use in a variety of potential applications, particularly in the transportation industry, including for example, aerospace, marine, automotive applications and other application where pressurized fluid tubes, such as fuel systems and hydraulic systems in aircraft, may be used. Thus, referring now to FIGS. 18 and 19, embodiments of the disclosure may be used in the context of an aircraft manufacturing and service method 114 as shown in FIG. 18 and an aircraft 116 as shown in FIG. 19. Aircraft applications of the disclosed embodiments may include, for example, without limitation, fuel and hydraulic systems that use tubes containing pressurized fluids. During pre-production, exemplary method 114 may include specification and design 118 of the aircraft 116 and material procurement 120. During production, component and subassembly manufacturing 122 and system integration 124 of the aircraft 116 takes place. Thereafter, the aircraft 116 may go through certification and delivery 126 in order to be placed in service 128. While in service by a customer, the aircraft 116 is scheduled for routine maintenance and service 130, which may also include modification, reconfiguration, refurbishment, and so on.

Each of the processes of method 114 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 116 produced by exemplary method 114 may include an airframe 132 with a plurality of systems 134 and an interior 136. Examples of high-level systems 134 include one or more of a propulsion system 138, an electrical system 140, a hydraulic system 142 and an environmental system 144. Any number of other systems may be included. Although an aerospace example is shown, the principles of the disclosure may be applied to other industries, such as the marine and automotive industries.

Systems and methods embodied herein may be employed during any one or more of the stages of the production and service method 114. For example, components or subassemblies corresponding to production process 122 may be fabricated or manufactured in a manner similar to components or subassemblies produced while the aircraft 116 is in service. Also, one or more apparatus embodiments, method embodiments, or a combination thereof may be utilized during the production stages 122 and 124, for example, by substantially expediting assembly of or reducing the cost of an aircraft 116. Similarly, one or more of apparatus embodiments, method embodiments, or a combination thereof may be utilized while the aircraft 116 is in service, for example and without limitation, to maintenance and service 130.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fluid line adapted to contain a pressurized fluid imposing varying loads on the line, comprising:
   a tube formed of plastic reinforced with fibers, wherein the fibers are locally tailored along a length of the tube;
   wherein the fibers are braided and include fiber orientations that are locally optimized to meet local load requirements in an area of a bend along the length of the tube by varying an angle formed between the fibers in the area of the bend.

2. The fluid line of claim 1, wherein the plastic is a thermoplastic.

3. The fluid line of claim 1, wherein the plastic is a thermoset.

4. The fluid line of claim 1, wherein a density of the fibers varies along the length of the tube.

5. The fluid line of claim 1, wherein the fibers include:
   axial fibers having 0 degree fiber orientations, and
   braid fibers having angled fiber orientations that vary along at least a portion of the length of the tube.

6. The fluid line of claim 1, wherein the fibers include an overwrapping of fibers having a 90 degree fiber orientation.

7. The fluid line of claim 1, wherein at least a portion of the tube has a cross sectional area having a non-uniform fiber density such that at least one outside radius section comprises additional fibers that give the cross sectional area the non-uniform fiber density, wherein the additional fibers were added during a braiding process.

8. A fuel line, comprising:
   at least a first tube adapted to contain a pressurized fuel, the first tube including a plurality of laminated layers of a braided composites;
   at least a second tube adapted to contain a pressurized fuel, the second tube including a plurality of laminated layers of a braided composite;
   a coupling between the first and second tubes, wherein the coupling is formed of a fiber reinforced plastic; and
   at least one bracket for mounting the fuel line on a supporting structure, wherein the bracket is formed of a fiber reinforced plastic.

9. The fuel line of claim 8, wherein the braided composite includes a plurality of sleeves of braided reinforcing fibers held in a plastic matrix.

10. The fuel line of claim 8, wherein reinforcing fibers have fiber orientations that are tailored to meet varying load requirements along a length of the first tube.

11. The fuel line of claim 9, wherein a density of the fibers varies along a length of the tube.

12. The fuel line of claim 8, wherein the braided composite includes a plurality of laminated sleeves of braided reinforcing fibers held in a plastic matrix.

13. The fuel line of claim 12, wherein the plastic matrix is a thermoplastic.

* * * * *